United States Patent
Stevenson et al.

(10) Patent No.: US 10,216,257 B2
(45) Date of Patent: Feb. 26, 2019

(54) POWER CONSUMPTION OPTIMIZATION USING INTERFERENCE MEASUREMENTS

(71) Applicant: SYNAPTICS INCORPORATED, San Jose, CA (US)

(72) Inventors: Matthew Stevenson, San Jose, CA (US); Sanjay Mani, Los Altos Hills, CA (US); Nickolas V. Fotopoulos, San Jose, CA (US); Derek Solven, San Jose, CA (US); Shubha Ramakrishnan, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 85 days.

(21) Appl. No.: 15/456,262

(22) Filed: Mar. 10, 2017

(65) Prior Publication Data
US 2018/0260016 A1  Sep. 13, 2018

(51) Int. Cl.
*G06F 1/00* (2006.01)
*G06F 1/3287* (2019.01)
*G06F 1/3296* (2019.01)
*G06F 1/324* (2019.01)

(52) U.S. Cl.
CPC ............ *G06F 1/3287* (2013.01); *G06F 1/324* (2013.01); *G06F 1/3296* (2013.01)

(58) Field of Classification Search
None
See application file for complete search history.

(56) References Cited

U.S. PATENT DOCUMENTS

| | | | | |
|---|---|---|---|---|
| 8,948,415 B1* | 2/2015 | Reid | ................. | H04W 52/0238 381/94.1 |
| 2007/0021091 A1* | 1/2007 | Trankle | .................. | H04B 1/109 455/337 |
| 2011/0063993 A1* | 3/2011 | Wilson | .................... | G06F 3/044 370/254 |
| 2012/0001859 A1* | 1/2012 | Kim | ...................... | G06F 3/0418 345/173 |
| 2012/0249476 A1* | 10/2012 | Schwartz | ................ | G06F 3/044 345/174 |

* cited by examiner

*Primary Examiner* — Nitin C Patel
(74) *Attorney, Agent, or Firm* — Paradice and Li LLP

(57) ABSTRACT

A method and related processing system and input device are disclosed for power consumption optimization using interference measurements. The method comprises applying, within a predefined first low-power operational mode, a first set of values for at least one predefined sensing parameter and corresponding to a first power consumption level; acquiring, within the first low-power operational mode, a first interference measurement using the plurality of sensor electrodes; transitioning, upon determining the first interference measurement exceeds a first interference threshold value, into a predefined high-power operational mode; and applying, within the high-power operational mode, a second set of values for the at least one predefined sensing parameter and corresponding to a second power consumption level greater than the first power consumption level.

21 Claims, 8 Drawing Sheets

POWER CONSUMPTION OPTIMIZATION USING INTERFERENCE MEASUREMENTS

BACKGROUND

Field

Embodiments disclosed herein generally relate to electronic devices, and more specifically, techniques for reducing power consumption of a sensing module by operating the sensing module in an operational mode selected based on interference measurements.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

According to various embodiments disclosed herein, data acquisition (DAQ) is optimized for low power consumption in the absence of interference. When interference is present, a DAQ system switches into an interference-optimized DAQ mode, in which higher levels of power consumption are allowed. Thus, the mode of operation of the DAQ system (and the corresponding power consumption level) is controlled using the interference measurements. In some cases, substantial changes of settings between different modes cause a trade-off of DAQ performance in order to achieve an overall power consumption optimization and/or reduction.

One embodiment described herein is a processing system comprising a sensing module comprising sensing circuitry configured to couple with a plurality of sensor electrodes. The sensing module is configured to apply, within a predefined first low-power operational mode, a first set of values for at least one predefined sensing parameter and corresponding to a first power consumption level; acquire, within the first low-power operational mode, a first interference measurement using the plurality of sensor electrodes; transition, upon determining the first interference measurement exceeds a first interference threshold value, into a predefined high-power operational mode; and apply, within the high-power operational mode, a second set of values for the at least one predefined sensing parameter and corresponding to a second power consumption level greater than the first power consumption level.

Another embodiment described herein is a method performed using a processing system coupled with a plurality of sensor electrodes. The method comprises applying, within a predefined first low-power operational mode, a first set of values for at least one predefined sensing parameter and corresponding to a first power consumption level; acquiring, within the first low-power operational mode, a first interference measurement using the plurality of sensor electrodes; transitioning, upon determining the first interference measurement exceeds a first interference threshold value, into a predefined high-power operational mode; and applying, within the high-power operational mode, a second set of values for the at least one predefined sensing parameter and corresponding to a second power consumption level greater than the first power consumption level.

Another embodiment described herein is an input device, comprising a plurality of sensor electrodes and a processing system configured to: apply, within a predefined first low-power operational mode, a first set of values for at least one predefined sensing parameter and corresponding to a first power consumption level; acquire, within the first low-power operational mode, a first interference measurement using the plurality of sensor electrodes; transition, upon determining the first interference measurement exceeds a first interference threshold value, into a predefined high-power operational mode; and apply, within the high-power operational mode, a second set of values for the at least one predefined sensing parameter and corresponding to a second power consumption level greater than the first power consumption level.

BRIEF DESCRIPTION OF THE DRAWINGS

The example embodiments are illustrated by way of example and are not intended to be limited by the figures of the accompanying drawings, where like reference numerals refer to corresponding parts throughout the drawing figures.

Figure 1:
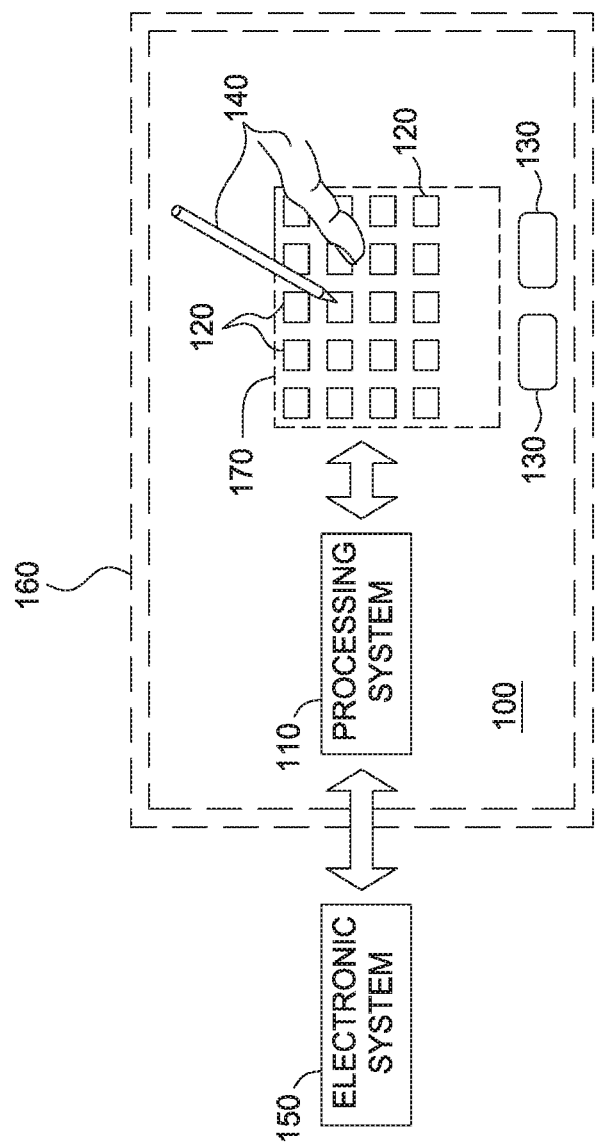
FIG. 1 is a schematic block diagram of an input device, according to embodiments described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Various embodiments of the present technology provide input devices and methods for improving power consumption. An input device may include electrodes that are operated as sensor electrodes to detect interaction between the input device and an input object (e.g., a stylus or a user's finger). More specifically, a processing system of the input device drives a capacitive sensing signal onto the sensor electrodes and acquires capacitive measurements based on resulting signals received by the same or other ones of the sensor electrodes.

One or more predefined sensing parameters control the operation of the transmitter circuitry and/or the receiver circuitry of the processing system. Certain implementations of a processing system can apply values for the one or more sensing parameters in order to meet certain constraints such as aligning with sensing frame and/or display frame timing, maintaining a stable or predictable capacitive baseline values, and/or avoiding sources of interference. However, the power consumption of the processing system when meeting these constraints is agnostic to a presence or absence of interference.

In various embodiments disclosed herein, in the absence of interference (e.g., an interference measurement is less than an interference threshold), the processing system is operated in a first operational mode. Within the first operational mode, the processing system applies a first set of values corresponding to the one or more predefined sensing parameters. The processing system has a first power consumption level in the first operational mode. The first operational mode causes the processing system to have a relatively large susceptibility to analog interference, as the processing system may operate with reduced processing (e.g., analog filtering and/or algorithmic noise reduction techniques) in the absence of interference.

Upon determining that a subsequent interference measurement exceeds the interference threshold, the processing system transitions into a second operational mode, in which a second set of values corresponding to the one or more predefined sensing parameters is applied. The processing system has a second power consumption level in the second operational mode, which is greater than the first power consumption level. Within the second operational mode, the processing system has a reduced susceptibility to analog interference in comparison to the first operational mode, which improves capacitive sensing performance under high-interference conditions.

In some embodiments, the first operational mode is implemented in hardware of the processing system (e.g., through hardware-based noise mitigation circuitry). In some embodiments, the processing system may include firmware noise mitigation methods (such as use of report filtering). The processing system may further include additional operational modes corresponding to relatively low power consumption or relatively high power consumption, e.g., an operational mode associated with detecting the presence of moisture on a display surface and/or an operational mode associated with the presence or absence of a horizontal sync (HSYNC) signal from an associated display device.

For example, a common voltage signal ("VCOM") of the display device can introduce noise that is disruptive to sensing measurements. The VCOM voltage has a periodicity, as is known in the art. The HSYNC signal indicates when the VCOM voltage switches, and a sensor arrangement can perform sensing measurements based on the timing of VCOM (e.g., immediately after the HSYNC signal is triggered).

Exemplary Input Device Implementations

FIG. 1 is a schematic block diagram of an input device 100, in accordance with embodiments of the present disclosure. In various embodiments, input device 100 comprises a display device integrated with a sensing device. The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system 150, or can be physically separate from the electronic system 150. As appropriate, the input device 100 may communicate with parts of the electronic system 150 using any one or more of the following: buses, networks, and other wired or wireless interconnections. Examples include I$^2$C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 170. Example input objects include fingers and styli, as shown in FIG. 1.

Sensing region 170 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 170 extends from a surface of the input device 100 in one or more directions into space until signal-to-noise ratios prevent sufficiently accurate object detection. The distance to which this sensing region 170 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 170 has a rectangular shape when projected onto an input surface of the input device 100.

The input device 100 may utilize any combination of sensor components and sensing technologies to detect user input in the sensing region 170. The input device 100 comprises a plurality of sensor electrodes 120 for detecting user input. The input device 100 may include one or more sensor electrodes 120 that are combined to form larger sensor electrodes. As several non-limiting examples, the input device 100 may use capacitive, elastive, resistive, inductive, magnetic acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensor electrodes 120 detect loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensor electrodes 120 to create electric fields. In some capacitive implementations, separate sensor electrodes 120 may be ohmically shorted together to form larger sensor electrodes. Some capacitive implementations utilize resistive sheets, which may be uniformly resistive.

As discussed above, some capacitive implementations utilize "self-capacitance" (or "absolute capacitance") sensing methods based on changes in the capacitive coupling between sensor electrodes 120 and an input object. In one embodiment, processing system 110 is configured to drive a voltage with known amplitude onto the sensor electrode 120 and measure the amount of charge required to charge the sensor electrode to the driven voltage. In other embodiments, processing system 110 is configured to drive a known current and measure the resulting voltage. In various embodiments, an input object near the sensor electrodes 120 alters the electric field near the sensor electrodes 120, thus changing the measured capacitive coupling. In one implementation, an absolute capacitance sensing method operates by modulating sensor electrodes 120 with respect to a reference voltage (e.g., system ground) using a modulated signal, and by detecting the capacitive coupling between the sensor electrodes 120 and input objects 140.

Additionally as discussed above, some capacitive implementations utilize "mutual capacitance" (or "transcapacitance") sensing methods based on changes in the capacitive coupling between sensing electrodes. In various embodiments, an input object 140 near the sensing electrodes alters the electric field between the sensing electrodes, thus changing the measured capacitive coupling. In one implementation, a transcapacitive sensing method operates by detecting the capacitive coupling between one or more transmitter sensing electrodes (also "transmitter electrodes") and one or more receiver sensing electrodes (also "receiver electrodes") as further described below. Signals on transmitter sensing electrodes may be modulated relative to a reference voltage (e.g., system ground) to transmit a transmitter signals. Receiver sensing electrodes may be held substantially constant relative to the reference voltage to facilitate receipt of resulting signals. A resulting signal may comprise effect(s) corresponding to one or more transmitter signals, and/or to one or more sources of environmental interference (e.g., other electromagnetic signals). Sensing electrodes may be dedicated transmitter electrodes or receiver electrodes, or may be configured to both transmit and receive.

In FIG. 1, the processing system 110 is shown as part of the input device 100. The processing system 110 is configured to operate the hardware of the input device 100 to detect input in the sensing region 170. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensor electrode(s) 120 of the input device 100. In other embodiments, components of processing system 110 are physically separate with one or more components close to sensor electrode(s) 120 of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensor electrodes 120 to detect input, identification modules configured to identify gestures such as mode changing gestures, and mode changing modules for changing operation modes. Processing system 110 may also comprise one or more controllers.

In some embodiments, the processing system 110 responds to user input (or lack of user input) in the sensing region 170 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensor electrode(s) 120 of the input device 100 to produce electrical signals indicative of input (or lack of input) in the sensing region 170. The processing system 110 may perform any appropriate amount of processing on the electrical signals in producing the information provided to the electronic system. For example, the processing system 110 may digitize analog electrical signals obtained from the sensor electrodes 120. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 170, or some other functionality. FIG. 1 shows buttons 130 near the sensing region 170 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 170 overlaps at least part of an active area of a display screen of the display device 160. For example, the input device 100 may comprise substantially transparent sensor electrodes 120 overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device 160 may share physical elements. For example, some embodiments may utilize some of the same electrical components for displaying and sensing. As another example, the display device 160 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Exemplary Sensor Electrode Implementations

Figure 2:
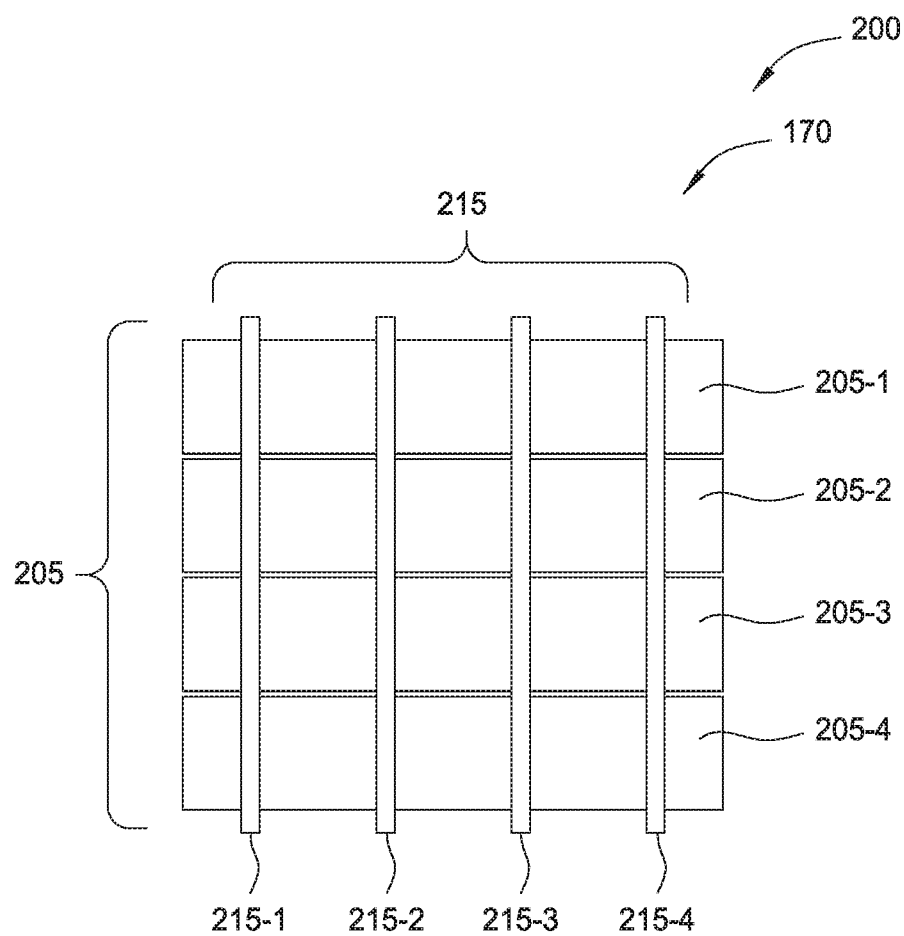
FIGS. 2 and 3 illustrate portions of exemplary sensor electrode implementations, according to embodiments described herein.
Figure 3:
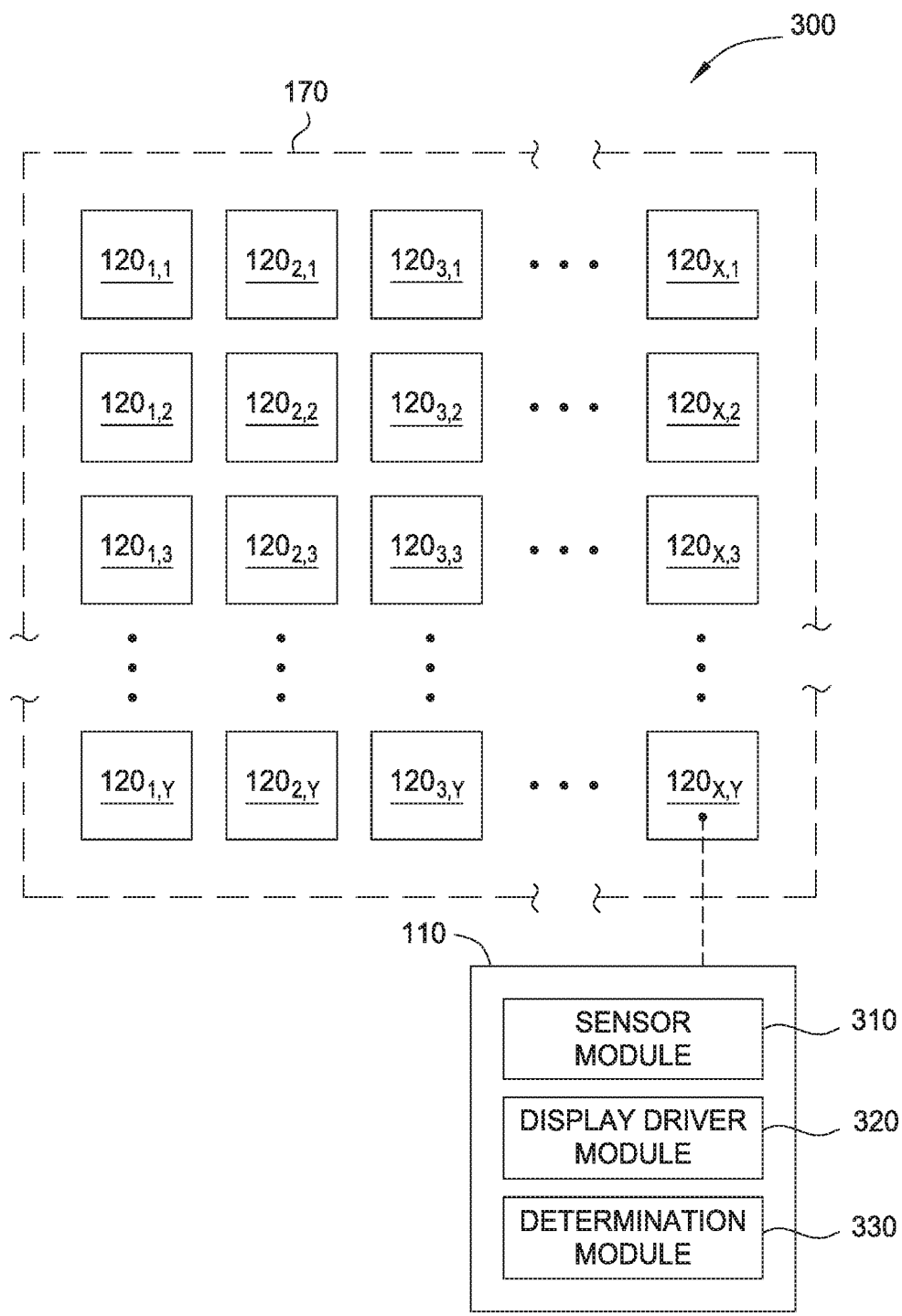

FIGS. 2 and 3 illustrate portions of exemplary sensor electrode implementations, according to embodiments described herein. Specifically, implementation 200 (FIG. 2) illustrates a portion of a pattern of sensor electrodes configured to sense in a sensing region 170 associated with the pattern, according to several embodiments. For clarity of illustration and description, FIG. 2 shows the sensor electrodes in a pattern of simple rectangles, and does not show various associated components. This pattern of sensing electrodes comprises a first plurality of sensor electrodes 205 (e.g., 205-1, 205-2, 205-3, 205-4), and a second plurality of sensor electrodes 215 (e.g., 215-1, 215-2, 215-3, 215-4). The sensor electrodes 205, 215 are each examples of the sensor electrodes 120 discussed above. In one embodiment, processing system 110 operates the first plurality of sensor electrodes 205 as a plurality of transmitter electrodes, and the second plurality of sensor electrodes 215 as a plurality of receiver electrodes. In another embodiment, processing system 110 operates the first plurality of sensor electrodes 205 and the second plurality of sensor electrodes 215 as absolute capacitive sensing electrodes.

The first plurality of sensor electrodes 205 and the second plurality of sensor electrodes 215 are typically ohmically isolated from each other. That is, one or more insulators separate the first plurality of sensor electrodes 205 and the second plurality of sensor electrodes 215 and prevent them from electrically shorting to each other. In some embodiments, the first plurality of sensor electrodes 205 and the second plurality of sensor electrodes 215 may be disposed on a common layer. The pluralities of sensor electrodes 205, 215 may be electrically separated by insulative material disposed between them at cross-over areas; in such constructions, the first plurality of sensor electrodes 205 and/or the second plurality of sensor electrodes 215 may be formed with jumpers connecting different portions of the same electrode. In some embodiments, the first plurality of sensor electrodes 205 and the second plurality of sensor electrodes 215 are separated by one or more layers of insulative material. In some embodiments, the first plurality of sensor electrodes 205 and the second plurality of sensor electrodes 215 are separated by one or more substrates; for example, they may be disposed on opposite sides of the same substrate, or on different substrates that are laminated together.

The pluralities of sensor electrodes 205, 215 may be formed into any desired shapes. Moreover, the size and/or shape of the sensor electrodes 205 may be different than the size and/or shape of the sensor electrodes 215. Additionally, sensor electrodes 205, 215 located on a same side of a substrate may have different shapes and/or sizes. In one embodiment, the first plurality of sensor electrodes 205 may be larger (e.g., having a larger surface area) than the second plurality of sensor electrodes 215, although this is not a requirement. In other embodiments, the first and second pluralities of sensor electrodes 205, 215 may have a similar size and/or shape.

In one embodiment, the first plurality of sensor electrodes 205 extends substantially in a first direction while the second plurality of sensor electrodes 215 extends substantially in a second direction. For example, and as shown in FIG. 2, the first plurality of sensor electrodes 205 extend in one direction, while the second plurality of sensor electrodes 215 extend in a direction substantially orthogonal to the sensor electrodes 205. Other orientations are also possible (e.g., parallel or other relative orientations).

In some embodiments, both the first and second pluralities of sensor electrodes 205, 215 are located outside of a plurality (or display stack) of layers that together form the display device 160. One example of a display stack may include layers such as a lens layer, a one or more polarizer layers, a color filter layer, one or more display electrodes layers, a display material layer, a thin-film transistor (TFT) glass layer, and a backlight layer. However, other arrangements of a display stack are possible. In other embodiments, one or both of the first and second pluralities of sensor electrodes 205, 215 are located within the display stack, whether included as part of a display-related layer or a separate layer. For example, VCOM electrodes within a particular display electrode layer can be configured to perform both display updating and capacitive sensing.

Implementation 300 of FIG. 3 illustrates a portion of a pattern of sensor electrodes configured to sense in sensing region 170, according to several embodiments. For clarity of illustration and description, FIG. 3 shows the sensor electrodes 120 in a pattern of simple rectangles and does not show other associated components. The exemplary pattern comprises an array of sensor electrodes $120_{X,Y}$ arranged in X columns and Y rows, wherein X and Y are positive integers, although one of X and Y may be zero. It is contemplated that the pattern of sensor electrodes 120 may have other configurations, such as polar arrays, repeating patterns, non-repeating patterns, a single row or column, or other suitable implementation. Further, in various embodiments the number of sensor electrodes 120 may vary from row to row and/or column to column. In one embodiment, at least one row and/or column of sensor electrodes 120 is offset from the others, such it extends further in at least one direction than the others. The sensor electrodes 120 is coupled to the processing system 110 and utilized to determine the presence (or lack thereof) of an input object in the sensing region 170.

In a first mode of operation, the implementation of sensor electrodes 120 ($120_{1,1}$, $120_{2,1}$, $120_{3,1}$, . . . , $120_{X,Y}$) may be utilized to detect the presence of an input object via absolute sensing techniques. That is, processing system 110 is configured to modulate sensor electrodes 120 to acquire measurements of changes in capacitive coupling between the modulated sensor electrodes 120 and an input object to determine the position of the input object. Processing system 110 is further configured to determine changes of absolute capacitance based on a measurement of resulting signals received with sensor electrodes 120 which are modulated.

In some embodiments, the implementation 300 includes one or more grid electrodes (not shown) that are disposed between at least two of the sensor electrodes 120. The grid electrode(s) may at least partially circumscribe the plurality of sensor electrodes 120 as a group, and may also, or in the alternative, completely or partially circumscribe one or more of the sensor electrodes 120. In one embodiment, the grid electrode is a planar body having a plurality of apertures, where each aperture circumscribes a respective one of the sensor electrodes 120. In other embodiments, the grid electrode(s) comprise a plurality of segments that may be driven individually or in groups of two or more segments. The grid electrode(s) may be fabricated similar to the sensor electrodes 120. The grid electrode(s), along with sensor electrodes 120, may be coupled to the processing system 110 utilizing conductive routing traces and used for input object detection.

The sensor electrodes 120 may be ohmically isolated from each other, and may also be ohmically isolated from the grid electrode(s). That is, one or more insulators separate the sensor electrodes 120 and grid electrode(s) and prevent them from electrically shorting to each other. In some embodiments, the sensor electrodes 120 and grid electrode(s) are separated by an insulative gap, which may be filled with an electrically insulating material, or may be an air gap. In some embodiments, the sensor electrodes 120 and the grid electrode(s) are vertically separated by one or more layers of insulative material. In some other embodiments, the sensor electrodes 120 and the grid electrode(s) are separated by one or more substrates; for example, they may be disposed on opposite sides of the same substrate, or on different substrates. In yet other embodiments, the grid electrode(s) may be composed of multiple layers on the same substrate, or on different substrates. In one embodiment, a first grid electrode may be formed on a first substrate (or a first side of a substrate) and a second grid electrode may be formed on a second substrate (or a second side of a substrate). For example, a first grid electrode comprises one or more common electrodes disposed on a thin-film transistor (TFT) layer of the display device 160 (FIG. 1) and a second grid electrode is disposed on the color filter glass of the display device 160. The dimensions of the first and second grid electrodes can be equal or differ in at least one dimension.

In a second mode of operation, the sensor electrodes 120 ($120_{1,1}$, $120_{2,1}$, $120_{3,1}$, . . . , $120_{X,Y}$) may be utilized to detect the presence of an input object via transcapacitive sensing techniques when a transmitter signal is driven onto the grid electrode(s). That is, processing system 110 is configured to drive the grid electrode(s) with a transmitter signal and to receive resulting signals with each sensor electrode 120, where a resulting signal comprising effects corresponding to the transmitter signal, which is utilized by the processing system 110 or other processor to determine the position of the input object.

In a third mode of operation, the sensor electrodes 120 may be split into groups of transmitter and receiver electrodes utilized to detect the presence of an input object via transcapacitive sensing techniques. That is, processing system 110 may drive a first group of sensor electrodes 120 with a transmitter signal and receive resulting signals with the second group of sensor electrodes 120, where a resulting signal comprising effects corresponding to the transmitter signal. The resulting signal is utilized by the processing system 110 or other processor to determine the position of the input object.

The input device 100 may be configured to operate in any one of the modes described above. The input device 100 may also be configured to switch between any two or more of the modes described above.

The areas of localized capacitive sensing of capacitive couplings may be termed "capacitive pixels," "touch pixels," "tixels," etc. Capacitive pixels may be formed between an individual sensor electrode 120 and a reference voltage in a first mode of operation, between the sensor electrodes 120 and grid electrode(s) in a second mode of operation, and between groups of sensor electrodes 120 used as transmitter and receiver electrodes (e.g., implementation 200 of FIG. 2) in a third mode of operation. The capacitive coupling changes with the proximity and motion of input objects 140 in the sensing region 170 associated with the sensor electrodes 120, and thus may be used as an indicator of the presence of the input object 140 in the sensing region 170 of the input device 100.

In some embodiments, the sensor electrodes 120 are "scanned" to determine these capacitive couplings. That is, in one embodiment, one or more of the sensor electrodes 120 are driven to transmit transmitter signals. Transmitters may be operated such that one transmitter electrode transmits at one time, or such that multiple transmitter electrodes transmit at the same time. Where multiple transmitter electrodes transmit simultaneously, the multiple transmitter electrodes may transmit the same transmitter signal and thereby produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined. In one embodiment, multiple transmitter electrodes may simultaneously transmit the same transmitter signal while the receiver electrodes receive the effects and are measured according to a scanning scheme.

The sensor electrodes 120 configured as receiver sensor electrodes may be operated singly or together to acquire resulting signals. The resulting signals may be used to determine measurements of the capacitive couplings at the capacitive pixels. Processing system 110 may be configured to receive with the sensor electrodes 120 in a scanning fashion and/or a multiplexed fashion to reduce the number of simultaneous measurements to be made, as well as the size of the supporting electrical structures. In one embodiment, one or more sensor electrodes are coupled to a receiver of processing system 110 via a switching element such as a multiplexer or the like. In such an embodiment, the switching element may be internal to processing system 110 or external to processing system 110. In one or more embodiments, the switching elements may be further configured to couple a sensor electrode 120 with a transmitter or other signal and/or voltage potential. In one embodiment, the switching element may be configured to couple more than one receiver electrode to a common receiver at the same time.

In other embodiments, "scanning" sensor electrodes 120 to determine these capacitive couplings comprises modulating one or more of the sensor electrodes and measuring an absolute capacitance of the one or sensor electrodes. In another embodiment, the sensor electrodes may be operated such that more than one sensor electrode is driven and received with at a time. In such embodiments, an absolute capacitive measurement may be obtained from each of the one or more sensor electrodes 120 simultaneously. In one embodiment, each of the sensor electrodes 120 are simultaneously driven and received with, obtaining an absolute capacitive measurement simultaneously from each of the sensor electrodes 120. In various embodiments, processing system 110 may be configured to selectively modulate a portion of sensor electrodes 120. For example, the sensor electrodes may be selected based at least in part on an application running on the host processor, a status of the input device, and an operating mode of the sensing device. In various embodiments, processing system 110 may be configured to selectively shield at least a portion of sensor electrodes 120 and to selectively shield or transmit with the grid electrode(s) while selectively receiving and/or transmitting with other sensor electrodes 120.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In any of the above embodiments, multiple sensor electrodes 120 may be ganged together such that the sensor electrodes 120 are simultaneously driven with modulated signals or simultaneously receive resulting signals. As compared to the methods described above, ganging together multiple sensor electrodes may produce a coarse capacitive image that may not be usable to discern precise positional information. However, a coarse capacitive image may be used to sense presence of an input object. In one embodiment, the coarse capacitive image may be used to move processing system 110 or the input device 100 out of a "doze" mode or low-power mode. In one embodiment, the coarse capacitive image may be used to move a capacitive sensing IC out of a "doze" mode or low-power mode. In another embodiment, the coarse capacitive image may be used to move at least one of a host IC and a display driver out of a "doze" mode or low-power mode. The coarse capacitive image may correspond to the entire sensor area or only to a portion of the sensor area.

The background capacitance of the input device 100 is the capacitive image associated with no input object in the sensing region 170. The background capacitance changes with the environment and operating conditions, and may be estimated in various ways. For example, some embodiments take "baseline images" when no input object is determined to be in the sensing region 170, and use those baseline images as estimates of their background capacitances. The background capacitance or the baseline capacitance may be present due to stray capacitive coupling between two sensor electrodes, where one sensor electrode is driven with a modulated signal and the other is held stationary relative to system ground, or due to stray capacitive coupling between a receiver electrode and nearby modulated electrodes. In many embodiments, the background or baseline capacitance may be relatively stationary over the time period of a user input motion.

Capacitive images can be adjusted for the background capacitance of the input device 100 for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, one or more of the sensor electrodes 120 comprise one or more display electrodes used in updating the display of the display screen. The display electrodes may comprise one or more elements of the active matrix display such as one or more segments of a segmented Vcom electrode (common electrode(s)), a source drive line, gate line, an anode sub-pixel electrode or cathode pixel electrode, or any other suitable display element. These display electrodes may be disposed on an appropriate display screen substrate. For example, the common electrodes may be disposed on the a transparent substrate (a glass substrate, TFT glass, or any other transparent material) in some display screens (e.g., In-Plane Switching (IPS), Fringe Field Switching (FFS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, the display electrode can also be referred to as a "combination electrode," since it performs multiple functions. In various embodiments, each of the sensor electrodes 120 comprises one or more common electrodes. In other embodiments, at least two sensor electrodes 120 may share at least one common electrode. While the following description may describe that sensor electrodes 120 and/or grid electrode(s) comprise one or more common electrodes, various other display electrodes as describe above may also be used in conjunction with the common electrode or as an alternative to the common electrodes. In various embodiments, the sensor electrodes 120 and grid electrode(s) comprise the entire common electrode layer (Vcom electrode).

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In various embodiments, the capacitive frame rate is an integer multiple of the display frame rate. In other embodiments, the capacitive frame rate is a fractional multiple of the display frame rate. In yet further embodiments, the capacitive frame rate may be any fraction or integer multiple of the display frame rate. In one or more embodiments, the display frame rate may change (e.g., to reduce power or to provide additional image data such as a 3D display information) while touch frame rate maintains constant. In other embodiment, the display frame rate may remain constant while the touch frame rate is increased or decreased.

Continuing to refer to FIG. 3, the processing system 110 coupled to the sensor electrodes 120 includes a sensing module 310 and optionally, a display driver module 320. The sensing module 310 includes circuitry configured to drive at least one of the sensor electrodes 120 for capacitive sensing during periods in which input sensing is desired. In one embodiment, the sensing module 310 is configured to drive a modulated signal onto the at least one sensor electrode 120 to detect changes in absolute capacitance between the at least one sensor electrode and an input object. In another embodiment, the sensing module 310 is configured to drive a transmitter signal onto the at least one sensor electrode 120 to detect changes in a transcapacitance between the at least one sensor electrode and another sensor electrode 120. The modulated and transmitter signals are generally varying voltage signals comprising a plurality of voltage transitions over a period of time allocated for input sensing. In various embodiments, the sensor electrodes 120 and/or grid electrode(s) may be driven differently in different modes of operation. In one embodiment, the sensor electrodes 120 and/or grid electrode(s) may be driven with signals (modulated signals, transmitter signals and/or shield signals) that may differ in any one of phase, amplitude, and/or shape. In various embodiments, the modulated signal and transmitter signal are similar in at least one shape, frequency, amplitude, and/or phase. In other embodiments, the modulated signal and the transmitter signals are different in frequency, shape, amplitude, and phase. The sensing module 310 may be selectively coupled to one or more of the sensor electrodes 120 and/or the grid electrode(s). For example, the sensing module 310 may be coupled to selected portions of the sensor electrodes 120 and operate in either an absolute or transcapacitive sensing mode. In another example, the sensing module 310 may be a different portion of the sensor electrodes 120 and operate in either an absolute or transcapacitive sensing mode. In yet another example, the sensing module 310 may be coupled to all the sensor electrodes 120 and operate in either an absolute or transcapacitive sensing mode.

The sensing module 310 is configured to operate the grid electrode(s) as a shield electrode that may shield sensor electrodes 120 from the electrical effects of nearby conductors. In one embodiment, the processing system is configured to operate the grid electrode(s) as a shield electrode that may "shield" sensor electrodes 120 from the electrical effects of nearby conductors, and to guard the sensor electrodes 120 from grid electrode(s), at least partially reducing the parasitic capacitance between the grid electrode(s) and the sensor electrodes 120. In one embodiment, a shielding signal is driven onto the grid electrode(s). The shielding signal may be a ground signal, such as the system ground or other ground, or any other constant voltage (i.e., non-modulated) signal. In another embodiment, operating the grid electrode(s) as a shield electrode may comprise electrically floating the grid electrode. In one embodiment, grid electrode(s) are able to operate as an effective shield electrode while being electrically floated due to its large coupling to the other sensor electrodes. In other embodiments, the shielding signal may be referred to as a "guarding signal" where the guarding signal is a varying voltage signal having at least one of a similar phase, frequency, and amplitude as the modulated signal driven on to the sensor electrodes. In one or more embodiments, routing traces may be shielded from responding to an input object due to routing beneath the grid electrode(s) and/or sensor electrodes 120, and therefore may be considered electrically isolated from the sensor electrodes 120.

In one or more embodiments, capacitive sensing (or input sensing) and display updating may occur during at least partially overlapping periods. For example, as a common electrode is driven for display updating, the common electrode may also be driven for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period. In such embodiments, the non-display update period may be referred to as a "long horizontal blanking period," "long h-blanking period" or a "distributed blanking period," where the blanking period occurs between two display updating periods and is at least as long as a display update period. In one embodiment, the non-display update period occurs between display line update periods of a frame and is long enough to allow for multiple transitions of the transmitter signal to be driven onto the sensor electrodes 120. In other embodiments, the non-display update period may comprise horizontal blanking periods and vertical blanking periods. Processing system 110 may be configured to drive sensor electrodes 120 for capacitive sensing during any one or more of or any combination of the different non-display update times. Synchronization signals may be shared between sensing module 310 and display driver module 320 to provide accurate control of overlapping display updating and capacitive sensing periods with repeatably coherent frequencies and phases. In one embodiment, these synchronization signals may be configured to allow the relatively stable voltages at the beginning and end of the input sensing period to coincide with display update periods with relatively stable voltages (e.g., near the end of a input integrator reset time and near the end of a display charge share time). A modulation frequency of a modulated or transmitter signal may be at a harmonic of the display line update rate, where the phase is determined to provide a nearly constant charge coupling from the display elements to the receiver electrode, allowing this coupling to be part of the baseline image.

The sensing module 310 includes circuitry configured to receive resulting signals with the sensor electrodes 120 and/or grid electrode(s) comprising effects corresponding to the modulated signals or the transmitter signals during periods in which input sensing is desired. The sensing module 310 may determine a position of the input object in the sensing region 170 or may provide a signal including information indicative of the resulting signal to another module or processor, for example, a determination module 330 or a processor of an associated electronic device 150 (i.e., a host processor), for determining the position of the input object in the sensing region 170.

The display driver module 320 may be included in or separate from the processing system 110. The display driver module 320 includes circuitry configured to provide display image update information to the display of the display device 160 during non-sensing (e.g., display updating) periods.

In one embodiment, the processing system 110 comprises a first integrated controller comprising the display driver module 320 and at least a portion of the sensing module 310 (i.e., transmitter module and/or receiver module). In another embodiment, the processing system 110 comprises a first integrated controller comprising the display driver module 320 and a second integrated controller comprising the sensing module 310. In yet another embodiment, the processing system comprises a first integrated controller comprising display driver module 320 and a first portion of the sensing module 310 (e.g., one of a transmitter module and a receiver module) and a second integrated controller comprising a second portion of the sensing module 310 (e.g., the other one of the transmitter and receiver modules). In those embodiments comprising multiple integrated circuits, a synchronization mechanism may be coupled between them, configured to synchronize display updating periods, sensing periods, transmitter signals, display update signals, and the like.

Exemplary Sensing Implementations

Figure 4A:
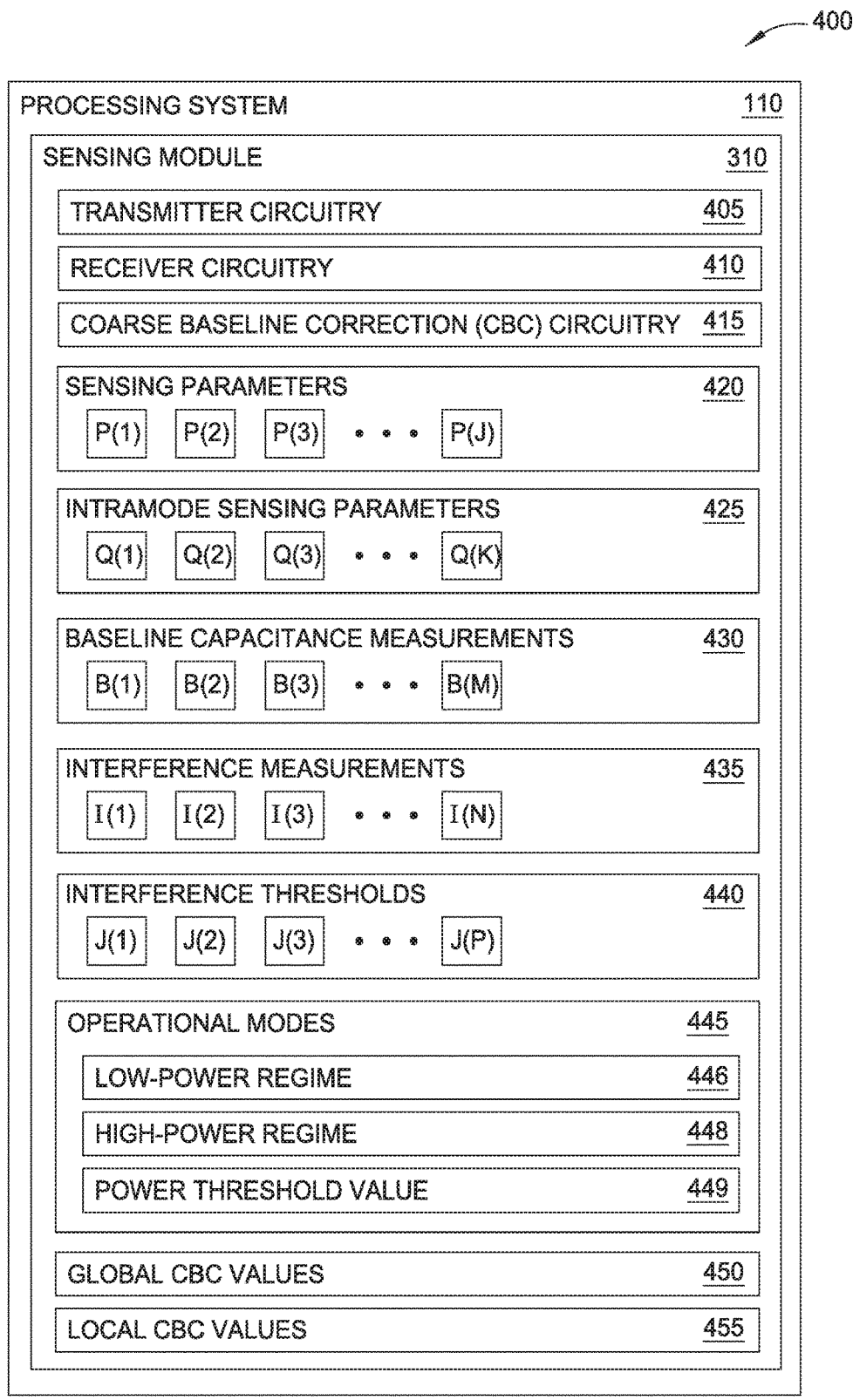
FIG. 4A illustrates an exemplary processing system for applying different sets of values for one or more predefined sensing parameters, according to embodiments described herein.

FIG. 4A illustrates an exemplary processing system for applying different sets of values for one or more predefined sensing parameters, according to embodiments described herein. More specifically, implementation 400 provides one possible implementation of the processing system 110 discussed above. Further, the implementation 400 is capable of use in conjunction with various embodiments discussed herein, such as the implementations 200, 300 of sensor electrodes discussed above with respect to FIGS. 2 and 3.

The sensing module 310 of the processing system 110 comprises transmitter circuitry 405, receiver circuitry 410, and coarse baseline correction (CBC) circuitry 415. To perform capacitive sensing, the transmitter circuitry 405 drives a capacitive sensing signal onto one or more first sensor electrodes. The one or more first sensor electrodes are in proximity to and are capacitively coupled with one or more second sensor electrodes. In some transcapacitive implementations, the first sensor electrodes are different than the second sensor electrodes. In some absolute capacitive implementations, the first sensor electrodes are the same as the second sensor electrodes. The receiver circuitry 410 detects resulting signals received by the second sensor electrodes responsive to driving the capacitive sensing signal onto the first electrodes. The transmitter circuitry 405 and receiver circuitry 410 may have any implementation suitable for performing the various functions described herein. The CBC circuitry 415 is generally configured to compensate for changes in the voltage at the input of the receiver circuitry 410 (i.e., $V_{RX}$) that are caused by driving the capacitive sensing signal onto the first sensor electrodes. The operation of CBC circuitry 415 is discussed in greater detail with respect to FIG. 7.

As shown, the sensing module 310 further comprises a plurality of predefined sensing parameters 420 that describe any suitable settings for configuring the operation of the transmitter circuitry 405 and/or receiver circuitry 410 for acquiring capacitive sensing data. Although a plurality of predefined sensing parameters 420 are depicted, embodiments may include as few as one predefined sensing parameter 420. Some non-limiting examples of sensing parameters 420 include (1) whether a timing of the sensing is based on one of a HSYNC signal and a vertical sync (VSYNC) signal for an associated display device, (2) a duration of integration periods performed (e.g., using the receiver circuitry 410) within the sensing, (3) a timing mode for performing transcapacitive sensing, (4) a burst size (or filter bandwidth) associated with the sensing, (5) a setting for an anti-aliasing filter, (6) a number of bursts during each sensing period, (7) a setting of a charge pump for generating a desired transmit voltage at the transmitter circuitry 405, (8) a code length for code division multiplexing of the capacitive sensing signal, (9) a modulation amplitude of the capacitive sensing signal, and (10) a setting for a reference channel. Alternate embodiments may include different sensing parameters or combinations of sensing parameters.

Each operational mode of the plurality of predefined operational modes 445 includes different values for at least one of the predefined sensing parameters 420. As a result, different operational modes 445 generally correspond to different power consumption values of the processing system 110.

The sensing module 310 further comprises a plurality of predefined intramode sensing parameters 425. In some embodiments, one or more intramode sensing parameters 425 may be adjusted while remaining within a particular operational mode 445. Some non-limiting examples of the intramode sensing parameters 425 include lengths of "stretch" periods that may be set such that integration duration and/or reset duration values may remain constant for changes in sensing frequency. For example, a decrease in sensing frequency generally corresponds to longer periods for performing sensing. Stretch periods may be adjust for those longer periods to maintain an integration duration and/or reset duration, e.g., to minimize shifts in capacitive baseline. Generally, changes to the intramode sensing parameters 425 result in an insubstantial change of power consumption by the processing system 110. In some embodiments, an insubstantial change of power consumption may be defined relative to changes to an individual intramode sensing parameter 425, or to changes to a plurality of intramode sensing parameters 425. For example, selecting different values from a range of acceptable values for an intramode sensing parameter 425 may cause a maximum change in power consumption that is less than a predefined threshold amount. Alternatively, the maximum change in power consumption may be defined relative to a difference between power consumption of two different operational modes. For example, an intramode sensing parameter 425 may cause a maximum change in power consumption that is less than or equal a predefined fraction of this difference.

Within conventional implementations of the processing system 110, values of the sensing parameters 420 and/or intramode sensing parameters 425 are typically controlled to meet other sensing constraints such as aligning with sensing frame and/or display frame timing, maintaining a stable or predictable capacitive baseline values, and/or avoiding sources of interference. However, the power consumption of the processing system 110 is generally not taken into consideration and agnostic to a presence or absence of interference.

In various embodiments herein, the processing system 110 (or sensing module 310) is operated in a selected one of a plurality of operational modes 445. Beneficially, the operation of the processing system 110 in a low-power operational mode during low-interference periods offers substantial power savings, when compared with conventional implementations of processing system 110. Each operational mode 445 corresponds to a set of values corresponding to one or more sensing parameters 420, which are applied when the processing system 110 enters the operational mode 445. The corresponding power consumption of the processing system 110 (or sensing module 310) while applying the set of values determines whether the operational mode is included within a low-power regime 446 or a high-power regime 448. In some embodiments, each operational mode 445 is included in one of the low-power regime 446 and the high-power regime 448 based on power consumption relative to a power threshold value 449.

The sensing module 310 may include additional operational modes within the high-power regime 448 and/or the low-power regime 446, e.g., an operational mode associated with detecting the presence of moisture on the screen, and/or an operational mode associated with the presence or absence of a HSYNC signal from an associated display device. In some embodiments, one or more operational modes included in the low-power regime 446 are implemented as hardware-based noise mitigation techniques within the sensing module 310. One or more operational modes within the high-power regime 448 may be implemented using firmware-based noise mitigation techniques within the sensing module 310.

Each operational mode 445 is associated with a baseline capacitance measurement 430. When acquiring capacitive measurements from different operational modes 445, the sensing module 310 normalizes the capacitive measurements relative to the different baseline capacitance measurements 430. In some embodiments, a shift in the baseline capacitance measurements 430 is calibrated in advance (e.g., during sensor tuning), and the shift is added to the baseline capacitance when transitioning between a first operational mode 445 of the low-power regime 446 and a second operational mode 445 of the high-power regime 448.

The set of values applied within different operational modes 445 may produce a relatively large shift in the baseline capacitance measurements 430, which may be especially pronounced for absolute capacitance implementations. In some embodiments, global CBC values 450 and local CBC values 455 for the CBC circuitry 415 are applied to accommodate the shift in the baseline. The global CBC values 450 and local CBC values 455 may be predetermined using a calibration or sensor tuning process.

Generally, the global CBC values 450 can be applied to the entire plurality of sensor electrodes coupled with the processing system 110, thereby influencing measurements that acquired from each sensor electrode. The local CBC values 455 are applied to measurements from only selected ones of the plurality of sensor electrodes. In some cases, the global CBC values 450 affect a plurality of channels of the processing system 110, while the local CBC values 455 affect a single channel. In some cases, the global CBC values 450 can correspond to non-overlapping subsets of the channels. In some embodiments, the global CBC values 450 and/or the local CBC values 455 are used to control scaling factors of current mirrors of CBC circuitry 415, which is discussed in greater detail with respect to FIG. 7.

In some embodiments, each operational mode 445 corresponds to respective global CBC values 450 and/or local CBC values 455. In these embodiments, upon transitioning from a first operational mode 445 of the low-power regime 446 to a second operational mode 445 of the high-power regime 448, different global CBC values 450 and/or local CBC values 455 corresponding to the second operational mode are applied.

In alternate embodiments, the local CBC values 455 for the different operational modes are calibrated at a startup of the sensing module 310. This generally permits optimal local CBC values 455 (e.g., reflecting sensor aging or other contemporaneous conditions) to be selected. However, the relationship between a change in local CBC values 455 and a change in baseline capacitance measurements 430 may not be linear due to imperfections of the sensing module 310, differences in operating conditions, and/or other factors. Thus, predicting the baseline capacitance shift from the local CBC values 455 calculated at startup or following a recalibration can have a fundamental uncertainty due to chip behavior. However, uncertainty in the baseline capacitance may be mitigated by calibrating the local CBC values to reflect the non-linearity.

In various embodiments, the sensing module 310 permits a reduced power consumption for relatively greater amounts of baseline capacitance shift within absolute capacitance sensing operation without requiring a reduced modulation amplitude to be used, and without limiting a sensing frequency range for different operational modes for absolute capacitance sensing and/or transcapacitance sensing.

The sensing module 310 is further configured to acquire a plurality of interference measurements 435 (or "noise measurements") using sensor electrodes coupled with the processing system. The interference measurements 435 may be determined according to any suitable interference metrics. In one non-limiting example of an interference metric, measurements are acquired from the receiving electrodes while the transmitter circuitry drives a constant signal. In another non-limiting example, internal circuitry is configured to measure interference simultaneous to measuring touch signal in the receiver circuitry. The interference measurements 435 may be acquired periodically (e.g., once per sensing frame) and/or responsive to a predetermined operational condition being met.

The interference measurements 435 may be compared with one or more interference thresholds 440 to determine whether to transition between different operational modes 445. In some embodiments, an interference measurement 435 exceeding an interference threshold 440 causes the sensing module 310 to be transitioned from a first operational mode 445 within the low-power regime 446 to a second operational mode 445 within the high-power regime 448. In some embodiments, interference measurements 435 may also be used to transition from the high-power regime 448 to the low-power regime 446, as well as transitioning between operational modes 445 within a particular power regime. In some embodiments, the plurality of interference thresholds 440 may correspond to different operational modes 445 of the plurality of operational modes 445. In other words, a target operational mode 445 may be selected from a plurality of possible operational modes 445 based at least in part on the interference measurement exceeding a particular interference threshold 440 associated with the target operational mode.

Operating within the different operational modes 445 based on interference measurements 435 can cause changes to the sensing configuration (i.e., according to the different sets of values for the various sensing parameters 420). In turn, the changes to the sensing configuration may affect the interference measurements 435. More specifically, interference measurements 435 that are acquired during a first operational mode 445 may differ from those acquired during a second operational mode 445. For example, assuming identical external source(s) of interference, an interference measurement 435 acquired in a high-power operational mode 445 may be greater than an interference measurement 435 acquired in a low-power operational mode 445. This may be due to operation of the sensing module 310 contributing greater interference to the interference measurement 435 in the high-power operational 445 mode.

In some embodiments, while operating in a first operational mode of the plurality of operational modes 445, a first set of values are applied for the sensing parameters 420. However, within the first operational mode, the interference measurements 435 are acquired while applying a second set of values different than the first set of values. In some embodiments, the second set of values corresponds to a second operational mode into which the sensing module 310 may transition. In this way, the noise environment or interference level corresponding to the second operational mode can be determined prior to transitioning.

For example, the sensing module 310 may be operating within a high-power operational mode (e.g., within the high-power regime 448). Within the high-power operational mode, the sensing module applies a first set of values for sensing parameters 420. To conserve power, the sensing module 310 may acquire interference measurements 435 to determine whether operation in low-power operational mode (e.g., within the low-power regime 446) is feasible. Thus, while operating in the relatively high-power operational mode, the sensing module 310 temporarily applies a second set of values corresponding to the low-power operational mode and compares the acquired interference measurement 435 with an interference threshold 440 associated with the low-power operational mode. If the acquired interference measurement 435 is less than the interference threshold 440 for the low-power operational mode, it is feasible for the sensing module 310 to transition into the low-power operational mode. While the example is discussed in terms of transitioning from one high-power operational mode to one low-power operational mode, the person of ordinary skill will understand that a transition may occur in the reverse direction (i.e., from lower power to higher power). The person of ordinary skill will further understand that the plurality of operational modes 445 may form a gradient of power consumption, such that transitions between operational modes may correspond to gradual increases or decreases of power consumption. For example, the sensing module 310 could transition from a high-power operational mode to an intermediate operational mode (having less power consumption than the high-power operational mode but greater than the low-power operational mode) before a possible transition to the low-power operational mode.

As discussed above, the sensing module 310 further comprises a plurality of predefined intramode sensing parameters 425 that may be adjusted while the sensing module 310 remains within a particular operational mode 445. In some embodiments, for a particular operational mode 445, the sensing module 310 acquires at least a first interference measurement 435 while applying a first set of values corresponding to capacitive sensing within the operational mode 445, and acquires at least a second interference measurement 435 while applying a second set of values corresponding to another operational mode 445. In one non-limiting example, the sensing module 310 acquires the first and second interference measurements 435 during each sensing frame. In this way, the sensing module 310 determines whether to adjust intramode sensing parameters 425 within the current operational mode 445 and/or whether to transition into another operational mode 445, such as transitioning from a low-power operational mode to a high-power operational mode or vice versa.

Figure 4B:
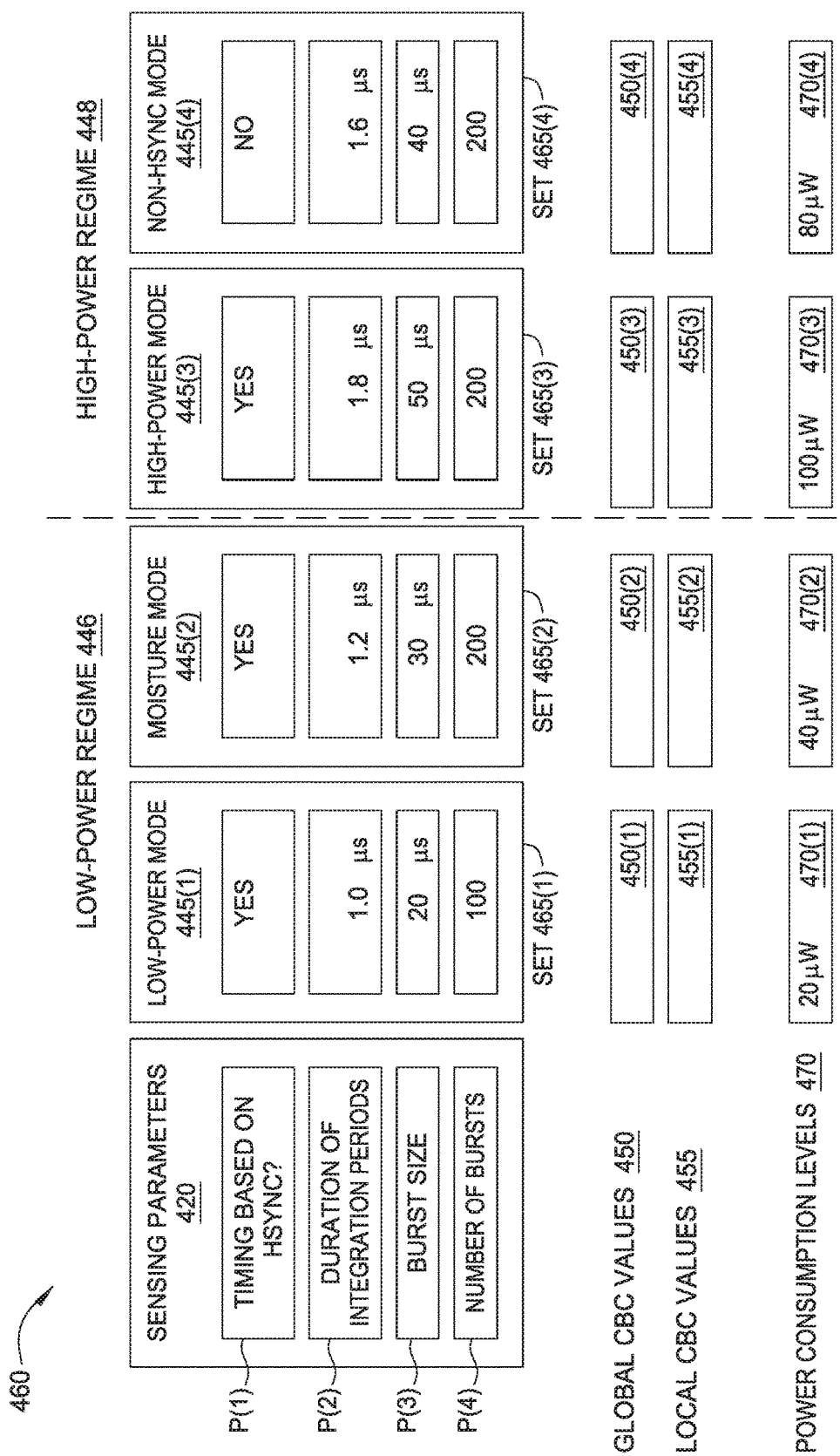
FIG. 4B is a diagram illustrating different sets of values for one or more predefined sensing parameters, according to embodiments described herein.

FIG. 4B is a diagram 460 illustrating different sets of values for one or more predefined sensing parameters, according to embodiments described herein. Diagram 460 illustrates a plurality of operational modes: a low-power operational mode 445(1) and a moisture operational mode 445(2) within the low-power regime 446, and a high-power operational mode 445(3) and a non-HSYNC operational mode 445(4) within the high-power regime 448. While four operational modes are depicted, alternate embodiments may include different numbers or distributions of operational modes.

Diagram 460 illustrates a set of four sensing parameters 420 having different values in the different operational modes. As shown, the sensing parameters 420 includes parameter P(1) indicating whether a timing of the sensing is based on a HSYNC signal, parameter P(2) indicating a duration of integration periods within the sensing, parameter P(3) indicating a burst size associated with the sensing, and parameter P(4) indicating a number of bursts performed during a sensing period. Other embodiments may have different numbers and/or combinations of sensing parameters 420.

Each operational mode 445(1), 445(2), 445(3), 445(4) corresponds to a respective set of values 465(1), 465(2), 465(3), 465(4) for the four sensing parameters 420. Each operational mode 445(1), 445(2), 445(3), 445(4) also corresponds to respective global CBC values 450 and/or one or more local CBC values 455. Each operational mode 445(1), 445(2), 445(3), 445(4) also corresponds to a respective power consumption level 470. As shown, the low-power regime 446 includes the low-power operational mode 445(1) having a power consumption level 470(1) of 20 microwatts (µW), and the moisture operational mode 445(2) having a power consumption level 470(2) of 40 µW. The high-power regime 448 includes the high-power operational mode 445(3) having a power consumption level 470(3) of 100 µW, and the non-HSYNC operational mode 445(4) having a power consumption level 470(4) of 80 µW. In some cases, the low-power regime 446 and high-power regime 448 may be separated by a power threshold value, such as 50 µW. The values provided in diagram 460 are intended as merely an example and are not limiting of the functionality of an associated processing system or sensing module.

Figure 5:
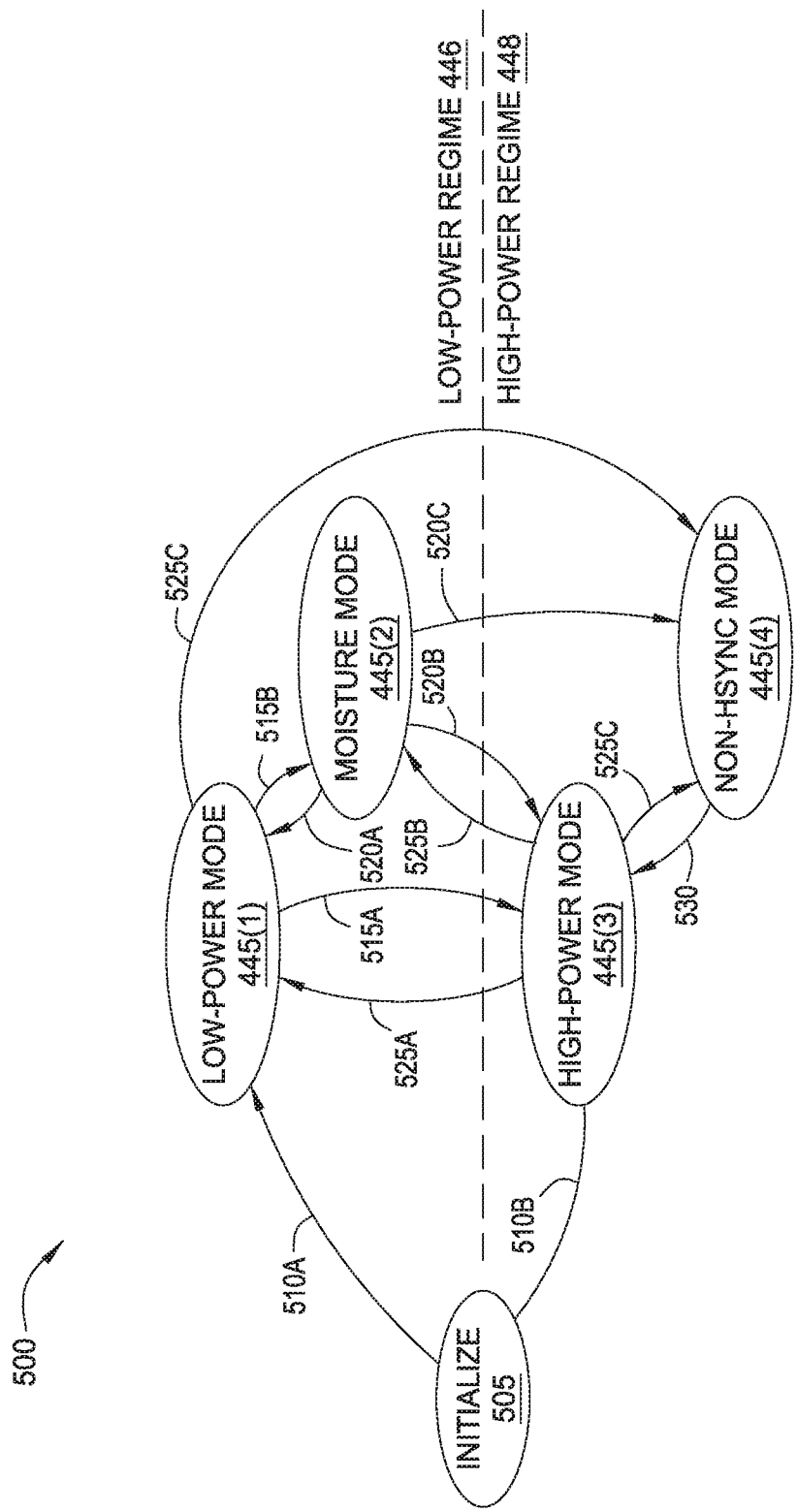
FIG. 5 is a state diagram illustrating different operational modes for a sensing module, according to embodiments described herein.

FIG. 5 is a state diagram 500 illustrating different operational modes for a sensing module, according to embodiments described herein. The state diagram 500 may be implemented in conjunction with any embodiments discussed herein. Generally, transitions between the different operational modes 445(1), 445(2), 445(3), 445(4) are determined based on acquired measurements, such as interference measurements, determining a presence of moisture, and determining a presence or absence of timing signals (such as HSYNC) from the display system.

The sensing module begins operation in an initialization state 505, in which the sensing module determines whether to operate in the low-power regime 446 or the high-power regime 448. Other initialization functions may also be performed within the initialization state 505, such as an initial calibration of global and/or local CBC values, acquiring initial capacitive baseline measurements, and so forth. In some embodiments, the sensing module has a pre-set default mode. For example, the sensing module may default to operating within the low-power regime 446. In some embodiments, the sensing module selects one of the low-power regime 446 and the high-power regime 448 based on one or more initial interference measurements. For example, upon determining that an interference measurement is less than an interference threshold, the sensing module follows path 510A into a low-power mode 445(1). If the interference measurement exceeds the interference threshold, the sensing module follows path 510B into a high-power mode 445(3).

From the low-power operational mode 445(1), and based on acquired interference measurements, the sensing module determines whether to remain within the low-power operational mode 445(1) or transition into one of the other operational modes 445(2), 445(3), 445(4). For example, when the interference measurements are less than an interference threshold value, the sensing module remains in the low-power operational mode 445(1). In one embodiment, the sensing module determines whether to transition from the low-power operational mode 445(1) to the moisture operational mode 445(2) along path 515B. This determination may be performed based at least in part on moisture estimates determined using acquired sensing data. In this embodiment, the sensing module transitions into an operational mode within the high-power regime 448 only after determining to not transition into the moisture operational mode 445(2). In an alternate embodiment, the sensing module assigns a higher priority to the high-power operational mode 445(3) over the moisture operational mode 445(2). In this way, if an acquired interference measurement is sufficiently large, the sensing module will transition into the high-power mode regardless of whether moisture is detected on the sensor electrodes. As shown, the sensing module transitions into the high-power operational mode 445(3) along path 515A or the non-HSYNC operational mode 445(4) along path 515C based on the acquired interference measurements and/or one or more other predefined conditions. One non-limiting example of transitioning based on a predefined condition is transitioning into the non-HSYNC operational mode 445(4) upon determining the absence of an HSYNC signal from the display. However, other predefined conditions are also possible.

From the moisture operational mode 445(2), and based on acquired interference measurements and/or the predefined conditions, the sensing module determines whether to remain in the moisture operational mode 445(2), or to transition into the low-power operational mode 445(1) along path 520A, into the high-power operational mode 445(3) along path 520B, or into the non-HSYNC mode 445(4) along path 520C.

From the high-power operational mode 445(3), and based on acquired interference measurements and/or the predefined conditions, the sensing module determines whether to remain in the high-power operational mode 445(3) or to transition into the low-power operational mode 445(1) along path 525A, into the moisture operational mode 445(2) along path 525B, or into the non-HSYNC mode 445(4) along path 525C.

From the non-HSYNC mode 445(4), and based on acquired interference measurements and/or the predefined conditions, the sensing module determines whether to remain in the non-HSYNC mode 445(4) or to transition into the high-power operational mode 445(3) along path 530.

As discussed above, interference measurements within a particular operational mode may be acquired while applying the set of values for performing capacitive sensing within the operational mode, and/or acquired while applying another set of values for performing capacitive sensing within another operational mode. For example, while the sensing module operates within the high-power operational mode 445(3), the sensing module acquires first interference measurements after applying a set of values for the high-power operational mode 445(3), and acquires second interference measurements after applying a second set of values corresponding to the low-power operational mode 445(1).

Figure 6:
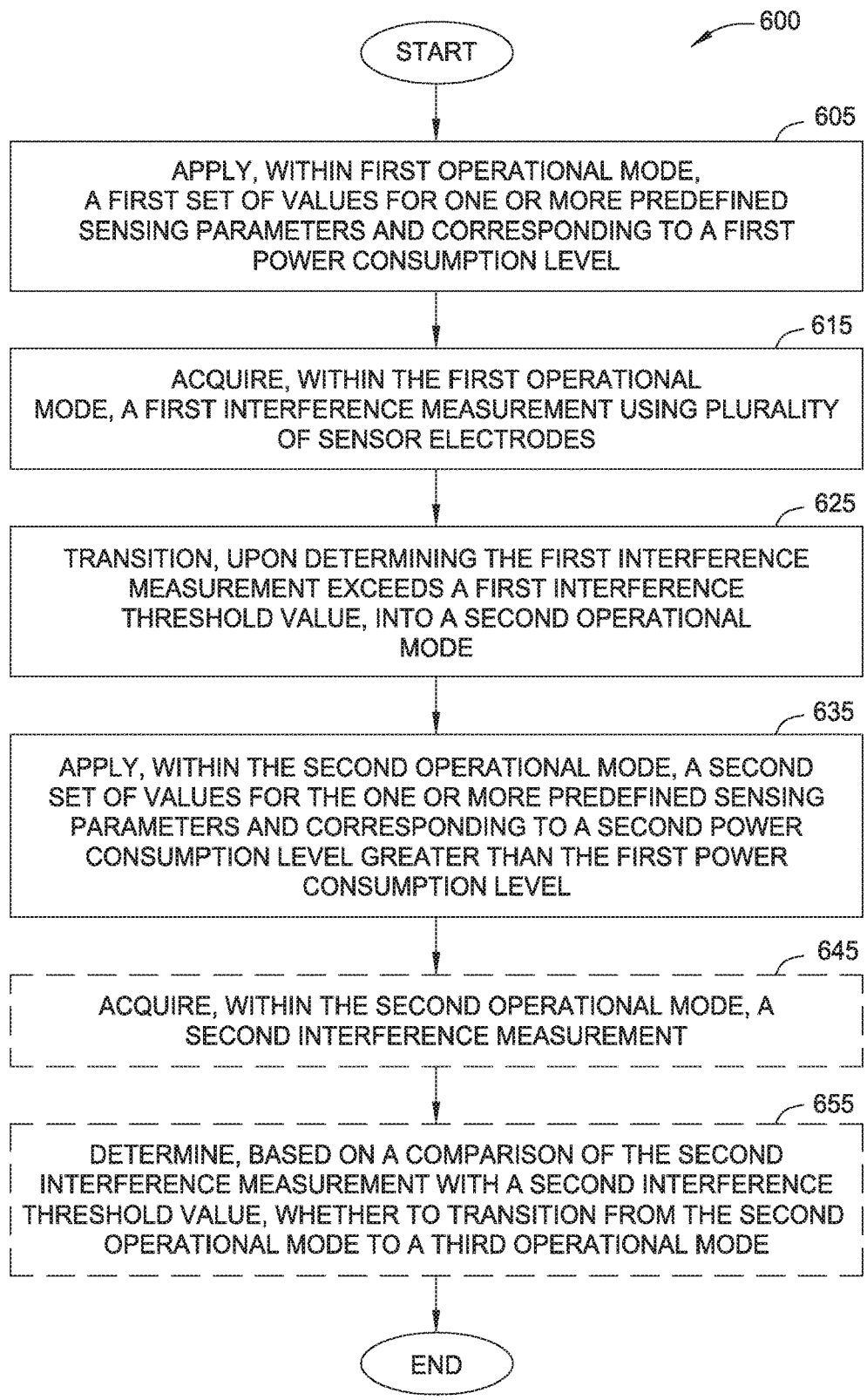
FIG. 6 illustrates a method for applying different sets of values for one or more predefined sensing parameters, according to embodiments described herein.

FIG. 6 illustrates a method 600 for applying different sets of values for one or more predefined sensing parameters, according to embodiments described herein. Method 600 may be implemented in conjunction with other embodiments, such as the sensing module 310 discussed above or any suitable alternate processing system.

Method 600 begins at block 605, where the sensing module applies, within a first operational mode, a first set of values for one or more predefined sensing parameters and corresponding to a first power consumption. In some embodiments, the first operational mode corresponds to a low-power operational mode within a predefined low-power regime, or to a high-power operational mode within a predefined high-power regime. At block 615, and within the first operational mode, the sensing module acquires a first interference measurement using a plurality of sensor electrodes. In some embodiments, the first interference measurement is acquired while applying the first set of values corresponding to the first operational mode. In other embodiments, the first interference measurement is acquired while temporarily applying another set of values that correspond to another operational mode. For example, in a high-power operational mode, the first interference measurement may be acquired while temporarily applying a set of values corresponding to a low-power operational mode.

At block 625, the sensing module transitions into a second operational mode upon determining that the first interference measurement exceeds a first interference threshold value. In some embodiments, the sensing module transitions into the second operational mode responsive to determining to not transition into another operational mode. For example, the sensing module may determine to transition from a low-power operational mode to a high-power operational mode upon determining not to transition into a predefined moisture operational mode. At block 635, the sensing module applies, within the second operational mode, a second set of values for the one or more predefined sensing parameters and corresponding to a second power consumption level greater than the first power consumption level. In some embodiments, the set of values temporarily applied in block 615 is the second set of values.

At optional block 645, the sensing module acquires a second interference measurement within the second operational mode. In some embodiments, while in the second operational mode, the second interference measurement is acquired while temporarily applying a set of values corresponding to a third operational mode.

At optional block 655, the sensing module determines, based on a comparison of the second interference measurement with a second interference threshold value, whether to transition from the second operational mode to a third operational mode. In some embodiments, the third operational mode is the same as the first operational mode. In other embodiments, the third operational mode is different than the first operational mode. Whether the first operational mode and the third operational mode are the same or different, in some embodiments, the second interference threshold value may be different than the first interference threshold value. Method 600 ends following completion of block 635 or block 655.

Figure 7:
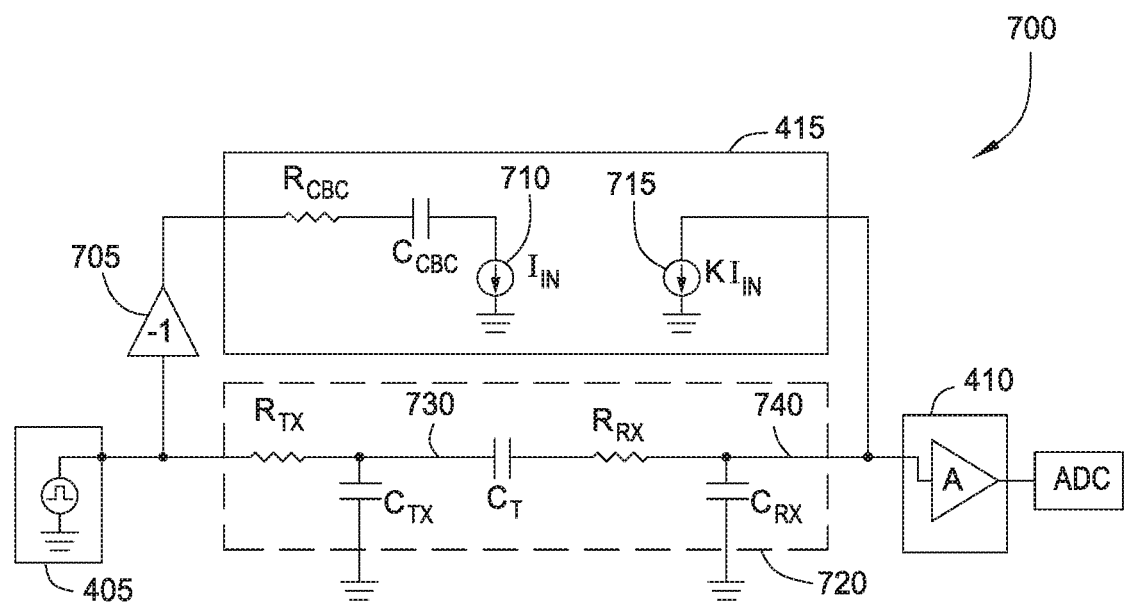
FIG. 7 is a circuit diagram of an exemplary current-mode coarse baseline correction circuit with a current mirror, according to embodiments described herein.

FIG. 7 is a diagram 700 of an exemplary current-mode CBC circuitry with a current mirror, according to embodiments described herein. The CBC circuitry may be implemented in conjunction with other embodiments, such as the processing system 110 discussed above or any suitable alternate processing system.

Within diagram 700, transmitter circuitry 405 is coupled with a transmitter electrode 730 of a sensor 720, and receiver circuitry 410 is coupled with a receiver electrode 740 of the sensor 720 and with CBC circuitry 415. The transmitter circuitry 405 and receiver circuitry 410 may have any suitable implementation for performing the functions described herein. Moreover, although not shown, the transmitter electrode 730 may also be coupled to receiver circuitry 410 while the receiver electrode 740 may also be coupled to transmitter circuitry 405.

During capacitive sensing, the transmitter circuitry 405 drives a transmitter signal onto the transmitter electrode 730. Because the transmitter electrode 730 is in close proximity to the receiver electrode 740, the two electrodes are capacitively coupled as shown by $C_T$. The two electrodes 730, 740 may be located on a same surface, on different sides of a same substrate, or on different substrates. Moreover, one or both of the electrodes 730, 740 may be integrated into a display device and be used when updating a displayed image.

The capacitive coupling causes the transmitter signal to generate a resulting signal on the receiver electrode 740. As an input object moves closer to the electrodes 730, 740, the input object may affect the resulting signal which is detected by the receiver circuitry 410 as discussed above. The CBC circuitry 415 operates to compensate for the change in the voltage at the input of the receiver circuitry 410 (i.e., $V_{RX}$) caused by driving the transmitter signal on the transmitter electrode 730. For example, in order to provide more headroom to lessen the likelihood that interfering signals may prevent the receiver circuitry 410 from detecting user interaction with the input device, the CBC circuitry 415 may source and/or sink a current at the input of receiver circuitry 410 that is based on the current sourced and/or sunk by transmitter circuitry 405 on the transmitter electrode 730. As will be discussed in greater detail below, the CBC circuitry 415 may include an effective capacitance that is similar to the coupling capacitance $C_T$. Using the voltage at the output of the transmitter circuitry 405 (i.e., $V_{TX}$) as an input signal, the CBC circuitry 415 provides at its output a current that compensates for the effects of the transmitter signal on the input voltage $V_{RX}$ of the receiver circuitry 410. For example, if the transmitter signal would cause the voltage $V_{RX}$ to rise from $V_{DD}/2$ to $3*V_{DD}/4$, the CBC circuitry 415 may sink a current that maintains $V_{RX}$ at $V_{DD}/2$. To do this, the CBC circuitry 415 may include at least one passive capacitor and a current mirror that outputs a current according to the voltage value at $V_{TX}$.

If, while driving the transmitter signal, an input object comes within close proximity to the electrodes 730, 740 (e.g., the input object contacts or is proximate to the sensing region 120 shown in FIG. 1), the voltage $V_{RX}$ may change. That is, the CBC circuitry 415 may compensate for the voltage change caused only by the transmitter signal in the absence of the input object. For example, assuming the transmitter signal is a square wave, the presence of the input object may cause $V_{RX}$ to fluctuate from 1.8 V to 2.2 V, but when the input object moves away from the sensing region, $V_{RX}$ may remain substantially fixed—e.g., 2.0 V. In this manner, the receiver circuitry 410 may reserve the voltage headroom that may have otherwise been used by the voltage changes caused by the transmitter signal for other uses such as reducing the likelihood an interfering signal from, e.g., an external power supply or RF source, will prevent the receiver circuitry 410 from detecting the input object.

Although the present embodiments are described in the context of transcapacitive (or mutual capacitive) sensing where a transmitting signal is driven onto a transmitter electrode 730 and a resulting signal is measured at receiver circuitry 410, the disclosure also applies to absolute capacitance sensing. In the absolute capacitance sensing case, for example, the CBC circuitry 415 may be used to mitigate a change in charge resulting from transmitting a modulating signal onto the sensor electrode.

Within diagram 700, the CBC circuitry 415 includes a resistance element $R_{CBC}$, a capacitor $C_{CBC}$, a current sensor 710, and a current mirror 715. The $R_{CBC}$ and $C_{CBC}$ of the CBC circuitry 415 may be programmable or adjustable to substantially match a time constant of the sensor 720, which includes the coupling capacitance $C_T$ between the transmitter electrode 730 and the receiver electrode 740, resistances $R_{TX}$ and $R_{RX}$ of the transmitter electrode 730 and the receiver electrode 740, and the background capacitances $C_{TX}$ and $C_{RX}$ associated with the transmitter electrode 730 and the receiver electrode 740. Substantially matching the time constant means that charge transferred through the CBC circuitry 415 is substantially aligned in time to the charge transferred through the electrodes 730, 740 of sensor 720. Because the inverting buffer 705 inverts the transmitter signal (which is shown here as a square wave but is not limited to such), the same amount of charge that is transferred from the transmitter electrode 730 to the receiver electrode 740 also flows from the input of the receiver circuitry 410 to the CBC circuitry 415, thereby leaving the voltage on the receiver electrode 740 and the voltage at the input of the receiver circuitry 410 substantially unchanged. Mitigating the effect of the transmitter signal on the input voltage of the receiver circuitry 410 may improve the dynamic range of the receiver circuitry 410 and enable the receiver circuitry 410 to linearly handle interfering signals and noise. Further still, if the charge transferred through $C_{CBC}$ is the negative of the charge transferred through $C_T$, the analog-to-digital converters (ADCs) downstream of the receiver circuitry 410 can be placed at center code, which allows for symmetrical ADC reference channel voltages and may increase the number of codes that can be used to detect the presence of an input object.

In one embodiment, the resistance $R_{CBC}$ and capacitance $C_{CBC}$ may be adjusted when manufacturing the input device. For example, the values of the sensor resistances $R_{TX}$ and $R_{RX}$ and the capacitances $C_{TX}$, $C_{RX}$, and $C_T$ may already be known, either via testing of the input device or being provided by the supplier of the sensor electrodes. Based on these values, the $R_{CBC}$ and $C_{CBC}$ values may be adjusted using, for example, digital control bits, to provide a similar time constant to the CBC circuitry 415 thereby synchronizing the electrical path through the CBC circuit with the electrical path through the sensor electrodes 730, 740.

Additionally, the resistance $R_{CBC}$ and/or capacitance $C_{CBC}$ may be dynamically adjusted when operating the input device. For example, the value $C_T$ may change based on environmental conditions such as moisture forming on a display screen proximate to the sensor electrode 730, 740. The value of $C_T$ may be periodically re-measured, and the values of $R_{CBC}$ and $C_{CBC}$ adjusted. Moreover, $R_{CBC}$ and/or $C_{CBC}$ may be adjusted for other reasons regardless whether the time constant associated with the sensor 720 changes. For example, it may be advantageous to adjust $R_{CBC}$ and/or $C_{CBC}$ to test the integral and differential nonlinearities of the ADCs.

As shown, the current mirror 715 mirrors the current ($I_{IN}$) flowing through the current sensor 710. More specifically, the current mirror 715 scales the current $I_{IN}$ by a factor K. In one embodiment, the current mirror 715 is programmable or adjustable such that the factor K (e.g., an integer, fractional, or irrational value) may be changed as desired. For example, if K is set to 10, then a 1 milliamp (mA) current flowing through current sensor 710 results in a 10 mA current outputted by the current mirror 715. Similarly, a charge of 1 pico-Coulomb (pC) injected into current sensor 710 results in 10 pC being absorbed by the current mirror 715.

By using the current mirror 715, the CBC circuitry 415 generally requires less space in an IC than other types of CBC circuits. For example, if $C_{CBC}$ was directly connected to the input of the receiver circuitry 410 rather than indirectly via the current sensor 710 and current mirror 715, the capacitance value of the $C_{CBC}$ may have to be substantially equal to the combined capacitance value of sensor 720. However, the scaling factor K of the current mirror 715 instead enables the capacitor $C_{CBC}$ to have a smaller capacitance than the capacitance of $C_T$ and still provide an equal, but reverse charge, at the input of the receiver circuitry 410. For example, if the capacitance of $C_T$ is 10 picofarads (pF), the $C_{CBC}$ may be 1 pF and the scale factor K may be set to 10 to thereby generate a current equal to an alternate CBC circuit that uses a 10 pF $C_{CBC}$. In this manner, the scaling factor K of the current mirror 715 produces effective capacitances that can be much larger than the value of capacitor $C_{CBC}$. Sourcing (or sinking) this scaled current compensates for the change in charge at the input of the receiver circuitry 410 caused by the transmitter signal. Moreover, the CBC circuitry 415 uses a capacitor $C_{CBC}$ that is smaller (as scaled by K) than would otherwise be required. Although the CBC circuitry 415 includes the current sensor 710 and current mirror 715, the total area required on an IC for these digital circuits and the passive capacitor $C_{CBC}$ (e.g., a 1 pF capacitor) may be less than the area required by a CBC circuit that uses a larger capacitor $C_{CBC}$ (e.g., a 10 pF capacitor) but does not include the current sensor 710 and current mirror 715.

In one embodiment, $C_{CBC}$ is a bank of passive capacitors that may be adjustably connected to provide different values of $C_{CBC}$. For example, two 1 pF $C_{CBC}$ capacitors may be selectively coupled in series to yield a 0.5 pF capacitance, or in parallel to yield a 2 pF capacitance. The capacitors in the bank of capacitors may have the same capacitance values or differing capacitance values. In this manner, the CBC circuitry 415 may dynamically adjust the capacitance value of $C_{CBC}$, the scaling factor K, or both.

In addition to reducing to size of the capacitor $C_{CBC}$, the CBC circuitry 415 may reduce the number of total capacitors needed relative to a CBC circuit that does include a current mirror. Using just one passive capacitor $C_{CBC}$ (or one bank of passive capacitors), the CBC circuitry 415 may perform coarse baseline correction for a plurality of receiver channels using a plurality of current mirrors. In contrast, without the current mirrors, other CBC circuits may require a separate CBC capacitor or a separate bank of CBC capacitors for each receiver in the input device. By using only one CBC capacitor and a plurality of current mirrors in the CBC circuitry 415 may require less space and reduce costs compared to using respective passive capacitors for each receiver channel.

In one embodiment, each of the plurality of current mirrors may have an individually programmable scaling factor $K_N$, which may be customized to match the properties of the electrical path that corresponds to the particular current mirrors. For example, the receiver circuitry 410 may include twenty receivers and thus, the CBC circuitry 415 may include twenty current mirrors 715 for correcting the charge at the input of each receiver of the receiver circuitry 410. However, the electrical paths associated with these receivers may be different. Specifically, the resistance and capacitance values of the sensor 520 disposed between the transmitter circuitry 405 and a receiver of the receiver circuitry 410 in one electrical path may differ from the resistances and capacitance values between the transmitter circuitry 405 and another receiver. As such, the scaling factor K allows the current mirrors 715 to be adjusted to match the electrical properties of their respective receiver channels. For example, if the electrical path between the transmitter and the receiver coupled to a first current mirror has a different capacitive value than the electrical path between the transmitter and the receiver coupled to a second current mirror, these two current mirrors may have different scaling factors $K_1$ and $K_2$ in order to match the charge flowing through the CBC circuit with the charge flowing between the transmitter circuitry 405 and their respective receivers. In one embodiment, the scaling factors K may be adjusted using digital control bits. Adjusting each scaling factor $K_N$ compensates for each one of multiple $C_T$ values. The values of $C_T$ between each receiver electrode 730 and each transmitter electrode 740 are in general, different. By adjusting the value of $K_N$ corresponding to each $C_T$ value, the effects of each $C_T$ may be mitigated.

The various illustrative logical blocks, modules, circuits, and algorithm steps described in connection with the aspects disclosed herein may be implemented as electronic hardware, computer software, or combinations of both. Various changes and modifications may be made herein without departing from the scope of the appended claims. Further, the functions, steps, or actions described in the method claims in accordance with aspects described herein need not be performed in any particular order unless expressly stated otherwise.

In view of the foregoing, the scope of the present disclosure is determined by the claims that follow.

What is claimed is:

1. A processing system comprising:
a sensing module comprising sensing circuitry configured to couple with a plurality of sensor electrodes,
wherein the sensing module is operable in at least a first low-power operational mode or a high-power operational mode and configured to:
apply a first set of values for at least one predefined sensing parameter while operating in the first low-power operational mode, the first set of values corresponding to a first power consumption level;
acquire a first interference measurement using the plurality of sensor electrodes while operating in the first low-power operational mode;
transition from the first low-power operational mode to the high-power operational mode upon determining that the first interference measurement exceeds a first interference threshold value; and
apply a second set of values for the at least one predefined sensing parameter while operating in the high-power operational mode, the second set of values corresponding to a second power consumption level that is greater than the first power consumption level.

2. The processing system of claim 1, wherein the at least one predefined sensing parameter is selected from a group consisting of:
whether a timing of the sensing is based on one of a horizontal sync (HSYNC) signal and a vertical sync (VSYNC) signal;
a duration of integration periods associated with sensing;
a timing mode for performing transcapacitive sensing;
a burst size associated with sensing;
a setting for an anti-aliasing filter;
a number of bursts during a sensing period;
a setting of a charge pump;
a code length for code division multiplexing;
a modulation amplitude of a sensing signal; and
a setting for a reference channel.

3. The processing system of claim 1, wherein the first low-power operational mode is one of a plurality of predefined low-power operational modes, each of the low-power operational modes having a respective power consumption level that is less than the second power consumption level of the high-power operational mode,
wherein transitioning from the first low-power operational mode to the high-power operational mode is performed responsive to determining to not transition from the first low-power operational mode to a predefined moisture operational mode of the plurality of predefined low-power operational modes.

4. The processing system of claim 1, wherein the sensing module is further configured to:
acquire a second interference measurement using the plurality of sensor electrodes while operating in the high-power operational mode; and
determine, based on a comparison of the second interference measurement with a second interference threshold value, whether to transition from the high-power operational mode to a second low-power operational mode.

5. The processing system of claim 4, wherein the sensing module is further configured to:
applying a third set of values for the at least one predefined sensing parameter when operating in the second low-power operational mode.

6. The processing system of claim 1, wherein the sensing module is further configured to:
apply a baseline shift value to subsequent capacitance measurements upon transitioning from the first low-power operational mode to the high-power operational mode, the baseline shift value reflecting a difference between a first baseline capacitance measurement of the first low-power operational mode and a second baseline capacitance measurement of the high-power operational mode.

7. The processing system of claim 6, wherein the baseline shift value comprises at least one of:
an updated global coarse baseline correction (CBC) value corresponding to all of the plurality of sensor electrodes, or
an updated local CBC value corresponding to fewer than all of the plurality of sensor electrodes.

8. A method performed using a processing system coupled with a plurality of sensor electrodes, the method comprising:
applying a first set of values for at least one predefined sensing parameter while the processing system operates in a first low-power operational mode, the first set of values corresponding to a first power consumption level;
acquiring a first interference measurement using the plurality of sensor electrodes while the processing system operates in the first low-power operational mode;
transitioning the processing system from the first low-power operational mode to a high-power operational mode upon determining that the first interference measurement exceeds a first interference threshold value; and
applying a second set of values for the at least one predefined sensing parameter while the processing system operates in the high-power operational mode, the second set of values corresponding to a second power consumption level that is greater than the first power consumption level.

9. The method of claim 8, wherein the at least one predefined sensing parameter is selected from a group consisting of:
whether a timing of the sensing is based on one of a horizontal sync (HSYNC) signal and a vertical sync (VSYNC) signal;
a duration of integration periods associated with sensing;
a timing mode for performing transcapacitive sensing;
a burst size associated with sensing;
a setting for an anti-aliasing filter;
a number of bursts during a sensing period;
a setting of a charge pump;
a code length for code division multiplexing;
a modulation amplitude of a sensing signal; and
a setting for a reference channel.

10. The method of claim 8, wherein the first low-power operational mode is one of a plurality of predefined low-power operational modes, each of the low-power operational modes having a respective power consumption level that is less than the second power consumption level of the high-power operational mode,
wherein transitioning the processing system from the first low-power operational mode to the high-power operational mode is performed responsive to determining to not transition the processing system from the first low-power operational mode to a predefined moisture operational mode of the plurality of predefined low-power operational modes.

11. The method of claim 8, further comprising:
acquiring a second interference measurement using the plurality of sensor electrodes while operating in the high-power operational mode; and
determining, based on a comparison of the second interference measurement with a second interference threshold value, whether to transition from the high-power operational mode to a second low-power operational mode.

12. The method of claim 11, further comprising:
applying a third set of values for the at least one predefined sensing parameter when operating the processing system in the second low-power operational mode.

13. The method of claim 8, further comprising:
applying a baseline shift value to subsequent capacitance measurements upon transitioning the processing system from the first low-power operational mode to the high-power operational mode, the baseline shift value reflecting a difference between a first baseline capacitance measurement of the first low-power operational mode and a second baseline capacitance measurement of the high-power operational mode.

14. The method of claim 13, wherein the baseline shift value comprises at least one of:
an updated global coarse baseline correction (CBC) value corresponding to all of the plurality of sensor electrodes, or
an updated local CBC value corresponding to fewer than all of the plurality of sensor electrodes.

15. An input device, comprising:
a plurality of sensor electrodes; and
a processing system operable in at least a first low-power operational mode or a high-power operational mode, the processing system configured to:
apply a first set of values for at least one predefined sensing parameter while operating in the first low-power operational mode, the first set of values corresponding to a first power consumption level;
acquire a first interference measurement using the plurality of sensor electrodes while operating in the first low-power operational mode;
transition from the first low-power operational mode to the high-power operational mode upon determining that the first interference measurement exceeds a first interference threshold value; and
apply a second set of values for the at least one predefined sensing parameter while operating in the high-power operational mode, the second set of values corresponding to a second power consumption level that is greater than the first power consumption level.

16. The input device of claim 15, wherein the at least one predefined sensing parameter is selected from a group consisting of:

whether a timing of the sensing is based on one of a horizontal sync (HSYNC) signal and a vertical sync (VSYNC) signal;
a duration of integration periods associated with sensing;
a timing mode for performing transcapacitive sensing;
a burst size associated with sensing;
a setting for an anti-aliasing filter;
a number of bursts during a sensing period;
a setting of a charge pump;
a code length for code division multiplexing;
a modulation amplitude of a sensing signal; and
a setting for a reference channel.

17. The input device of claim 15, wherein the first low-power operational mode is one of a plurality of predefined low-power operational modes, each of the low-power operational modes having a respective power consumption level that is less than the second power consumption level of the high-power operational mode,
wherein transitioning from the first low-power operational mode to the high-power operational mode is performed responsive to determining to not transition from the first low-power operational mode to a predefined moisture operational mode of the plurality of predefined low-power operational modes.

18. The input device of claim 15, wherein the processing system is further configured to:
acquire a second interference measurement using the plurality of sensor electrodes while operating in the high-power operational mode; and
determine, based on a comparison of the second interference measurement with a second interference threshold value, whether to transition from the high-power operational mode to a second low-power operational mode.

19. The input device of claim 18, wherein the processing system is further configured to:
apply a third set of values for the at least one predefined sensing parameter when operating in the second low-power operational mode.

20. The input device of claim 15, wherein the processing system is further configured to:
apply a baseline shift value to subsequent capacitance measurements upon transitioning from the first low-power operational mode to the high-power operational mode, the baseline shift value reflecting a difference between a first baseline capacitance measurement of the first low-power operational mode and a second baseline capacitance measurement of the high-power operational mode.

21. The input device of claim 20, wherein the baseline shift value comprises at least one of:
an updated global coarse baseline correction (CBC) value corresponding to all of the plurality of sensor electrodes, or
an updated local CBC value corresponding to fewer than all of the plurality of sensor electrodes.

* * * * *